GEORGE W. COFFEE.
Improvement in Piston-Packing.

No. 126,624. Patented May 14, 1872.

Witnesses.

Inventor.
George W Coffee.
Assignor to himself and
John W. Tucker By Atty C W M Smith 126,624

UNITED STATES PATENT OFFICE.

GEORGE W. COFFEE, OF SAN FRANCISCO, CALIFORNIA, ASSIGNOR TO HIMSELF AND JOHN W. TUCKER, OF SAME PLACE.

IMPROVEMENT IN GASKET-PACKINGS.

Specification forming part of Letters Patent No. 126,624, dated May 14, 1872.

SPECIFICATION.

*To all whom it may concern:*

Be it known that I, GEORGE W. COFFEE, of San Francisco, in the county of San Francisco and State of California, have invented an Improved Gasket for Steam-Engines, Pistons, Pumps, &c.; and I do hereby declare that the following is a full and exact description of the same, reference being had to the accompanying drawing and to the letters of reference marked thereon.

This invention relates to an improved elastic gasket or packing device, for making close-fitting joints for either steam, water, or gas-fixtures, and more especially valuable in any places where, from irregularity of shape or surface, it is difficult to obtain a proper joint, as in man-hole plates or hand-hole plates; and consists mainly in constructing the gasket or packing of elastic material, such as rubber, gutta-percha, or like substances, and giving its surface, while forming, a series of inequalities or corrugations, the portions which are elevated having a comparatively small bearing-surface, so that when the gasket rests on the surface where the joint is to be made, and has the covering-plate or flange screwed down upon it, these raised edges will be forced into any groove or inequality, filling it completely, and thus making a perfect-fitting joint.

Figure 1:
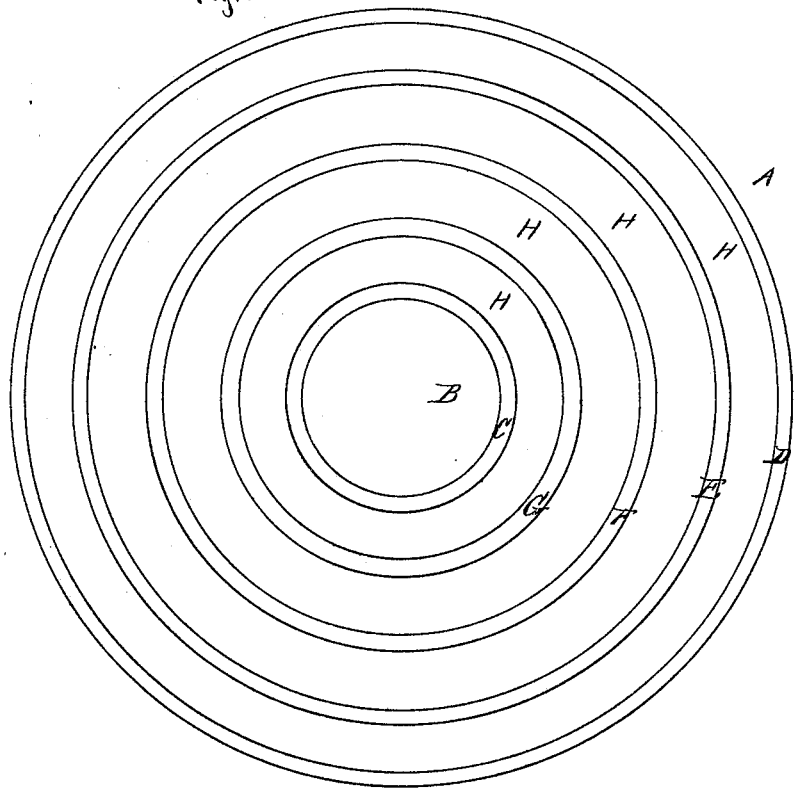
Figure 2:
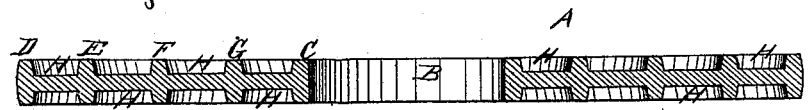

In the drawing, Figure 1 is a plan or side view of one form of my gasket. Fig. 2 is a transverse section taken through the center, and showing the corrugations.

Similar letters of reference indicate like parts in each of the figures.

To enable others skilled in the art to which my invention appertains to make and use the same, I will now proceed to describe my improved device with the appliances for carrying it into effect.

A is a plate, constructed of gutta-percha or any similar elastic material, and made in sizes and of a contour to suit the different classes of work to which the gasket may be applied. In the present case the gasket is shown as circular, and having an opening, B, through the center; yet other forms may be employed of the same material, having plane or smooth surfaces. At the edge of this central opening and at the circumference of the disk are raised flanges C D, of the material which forms the gasket. Between these flanges, at regular or suitable intervals for the work to which the device will be applied, are formed other raised edges E F G, as shown, so that spaces H are left between the raised portions, as plainly shown in Fig. 2.

The gasket being laid in position the closing-plate or flange is laid over it and secured to its place by bolts, yokes, or otherwise, thus forcing the raised portions of the gasket to fill all inequalities and indentations which may occur, and also making it conform perfectly to the contour of the surface covered.

By this device I am enabled to provide a cheap and efficient gasket or packing for joints.

Having thus described my invention, what I claim, and desire to secure by Letters Patent, is—

A gasket or packing, constructed with the corrugations or raised portions, as shown, and constructed to operate substantially as and for the purpose herein described.

In witness whereof I have hereunto set my hand and seal.

GEORGE W. COFFEE. [L. S.]

Witnesses:
C. W. M. SMITH,
H. S. TIBBEY.